US006859589B2

(12) United States Patent
Taylor et al.

(10) Patent No.: US 6,859,589 B2
(45) Date of Patent: Feb. 22, 2005

(54) ALIGNMENT OF OPTICAL WAVEGUIDES

(75) Inventors: Rod Taylor, Ottawa (CA); Cyril Hnatovsky, Ottawa (CA)

(73) Assignee: National Research Council of Canada, Ottawa (CA)

( * ) Notice: Subject to any disclaimer, the term of this patent is extended or adjusted under 35 U.S.C. 154(b) by 246 days.

(21) Appl. No.: 10/122,235

(22) Filed: Apr. 16, 2002

(65) Prior Publication Data

US 2003/0194186 A1 Oct. 16, 2003

(51) Int. Cl.⁷ .................................................. G02B 6/26
(52) U.S. Cl. .......................................... 385/52; 385/50
(58) Field of Search ............................... 385/50–52, 97, 385/98, 123–127; 65/385, 406, 407, 4; 356/399–401, 505, 614, 615, 620, 621; 216/11, 24

(56) References Cited

U.S. PATENT DOCUMENTS

| 4,474,469 A | * | 10/1984 | Abe ............................. 356/399 |
| 5,042,709 A | * | 8/1991 | Cina et al. .................... 228/105 |
| 5,812,718 A | * | 9/1998 | Carpenter et al. ............. 385/97 |
| 6,046,798 A | * | 4/2000 | Zamzow ...................... 356/73.1 |

FOREIGN PATENT DOCUMENTS

JP        58176612 A  * 10/1983  ............ G02B/7/26

* cited by examiner

Primary Examiner—John D. Lee
Assistant Examiner—Sarah U Song
(74) Attorney, Agent, or Firm—Marks & Clerk

(57) ABSTRACT

In order to make alignable optical waveguides, an alignment structure is formed on at least one opposable end of the waveguides by selective chemical etching of different portions of the waveguides. The waveguides can then be brought into alignment with the alignment structure. Preferably, a pair of complementary alignment structures are formed on opposed ends of adjoining waveguides.

34 Claims, 4 Drawing Sheets

Chemically Etched Conical Structure on a Corning SMF-28 Telecom Fiber

Chemically Etched Conical Structure on a Corning SMF-28 Telecom Fiber

ALIGNMENT OF OPTICAL WAVEGUIDES

BACKGROUND OF THE INVENTION

1. Field of the Invention

This invention relates to the field of optical communications, and in particular to a method of aligning optical waveguides.

2. Description of Related Art

Optical waveguides, which typically consist of a core layer surrounded by a cladding layer, are used extensively in modern telecommunications as a transport medium. There is a need to be able to quickly and cheaply, yet accurately and reliably, align waveguides so that high performance interconnects can be made. Typically, in order to properly align two single-mode telecom fibers, sub-micron accuracy in three translational dimensions is required, as well as fiber tilt correction for non-coaxial fiber axes. Any technique used must be easy to perform and capable of automation.

There are many ways of making optical interconnects. One technique is based on optimizing the optical transmission through the two waveguides. U.S. Pat. No. 4,325,607 discloses the use of special sleeves. S. Berglund, 31' Annual Connector and Interconnection Symposium, Waretown, N.J., USA, pp183–198, 1998 suggests the use of precision ferrules and V-grooves as alignment guides. U.S. Pat. Nos. 5,511,138 and 5,633,968 disclose the use of interlocking guiding pins outside the waveguide structure.

The making of an optical connection based upon optimizing light throughput is laborious as light has to be coupled into one of the waveguides and the light transmission measured through the connected guide. In the case of polarization maintaining fibers raw transmission optimization is not a sufficiently accurate alignment technique to preserve a high degree of polarization.

The use of special sleeves and ferrules requires precision manufacturing and is sensitive to variations in fiber diameter and/or core offset.

V-grooves can be used to align fibers to arrays of microfabricated waveguides, but they must be made with tight tolerances so that there is no drift in alignment across an array. V-grooves are also sensitive to variations in fiber diameter and core offset as well as to debris which can collect in the grooves.

The use of interlocking pins fabricated on a structure which supports the waveguides but is outside the waveguide's core and cladding as disclosed in U.S. Pat. Nos. 5,511,138 and 5,633,968 requires extremely high accuracy for the insertion of pins into receptacles, especially for an array of waveguides which can span a greater distance than a single guide. Again this technique is also sensitive to variations in fiber diameter and core offset.

U.S. Pat. No. 3,883,353 describes the use of a photolithographic process to create a protrusion on one fiber core which can be inserted into a photolithographically produced receptacle on a second fiber core to connect two single-mode fibers. The construction process as described in this patent involves coating the fibers with a light sensitive material, such as a photoresist, exposing the photoresist to Ultra Violet (UV) light in the core region by coupling light into the fibers, developing the resists, chemically etching the exposed regions, and finally removing the resist masks. The main drawback of this approach is the use of a complicated time consuming procedure to create the protrusion and receptacle parts. The inventors also point out that a serious drawback with their approach is that the UV can expose a wider region than just the core, which reduces the accuracy and reliability of the technique. Furthermore, this patent does not describe how to align the protrusion and receptacle parts.

SUMMARY OF THE INVENTION

In the preferred embodiment complementary alignment structures are formed on the respective opposable ends. In one embodiment, the alignment structures consist of a generally conical protrusion and complementary recess. It will be understood that the protrusion is not necessarily strictly conical in the geometric sense. For example, it will generally be more frusto-conical because the tip will be truncated or rounded. Also, the recess does not have to exactly match the protrusion. However in order to achieve optimum coupling any air gap should be either eliminated by fusion splicing or by filling the gap with a small quantity of index matching compound without disturbing the alignment. This may require the use of low viscosity index matching fluid and vertical positioning of the waveguides, with the waveguide with the recess pointed in the up direction, to allow the fluid to rut into the air gap in a symmetric fashion.

Although it is possible for the invention to work with only one alignment structure, in the preferred embodiment complementary alignment structures are formed on the respective opposable ends. In one embodiment, the alignment structures consist of a generally conical protrusion and complementary recess. It will be understood that the protrusion is not necessarily strictly conical in the geometric sense. For example, it will generally be more frusto-conical because the tip will be truncated or rounded. Also, the recess does not have to exactly match the protrusion. However in order to achieve optimum coupling any air gap should be either eliminated by fusion splicing or by filling the gap with a small quantity of index matching compound without disturbing the alignment. This may require the use of low viscosity index matching fluid and vertical positioning of the waveguides, with the waveguide with the recess pointed in the up direction, to allow the fluid to run into the air gap in a symmetric fashion.

Selective chemical etching refers to the process whereby advantage is taken of the fact that different materials, or similar materials with different dopants or different concentrations of dopant, for example, etch at different rates so that when an etchant is applied to such materials structures are formed as a result of the different amounts of etching occurring after a certain amount of time.

The waveguides typically consist of a doped $SiO_2$ core surrounded by a $SiO_2$ cladding layer, in which case the selective chemical etching is carried out with chemical etchants that preferentially etch the core or cladding layer. For example, BOE (Buffered Oxide Etchant) can be used to preferentially etch the cladding to form a protrusion in the core region. HF can be used to preferentially etch the core and form a complementary recess.

Alternatively, the invention can be applied to plastic waveguides, in which case suitable organic solvents can be employed.

When the two waveguides are brought together the protrusion prevents closure of the gap between the cladding end faces. The position of one waveguide relative to the other is varied until the protrusion docks into the hole, closing the gap. The docking acts to snap the two waveguides together at which point they can be glued with index matching epoxy or fusion spliced. The waveguides can form part of a microfabricated array of waveguides.

In a preferred embodiment, the present invention uses selective chemical etching of the ends of two waveguides to be connected in order to produce a protrusion and a receptacle in the core regions respectively. In the case of one waveguide which could for example be a single-mode fiber, an etchant is chosen (e.g. buffered oxide etchant (BOE)) which preferentially etches the cladding layer relative to the core to produce a robust conical-like structure a few microns high.

The conical structures are highly reproducible and can be fabricated with submicron accuracy for a wide range of telecom fibers. Similarly the hole structures are very straightforward to produce. The waveguide etching can be done in a batch process and is therefore very inexpensive.

In a further advantageous embodiment the diameter of one or both fibers can be reduced. A standard telecom fiber typically has a diameter of 125 $\mu$m. This can be reduced by about 20%, typically to 100 $\mu$m for one fiber and by a factor of about 3 typically to 40 $\mu$m, for the other fiber, usually the fiber with the protrusion. This arrangement means that as the fibers are brought together using the alignment structures as a guide, the inherent flexibility in the fiber with the smaller diameter allows the protrusion to "snap" into the hole even if the two fibers are not exactly coaxial with respect to each other as they come together.

In another aspect the invention provides a method of aligning optical waveguides having portions of the waveguides outside of the core region with different etch characteristics, comprising providing an alignment structure on at least one opposable end of said waveguides by selective chemical etching of said portions relative to each other; gradually bringing said opposable ends together; monitoring the relative position of said alignment structure as a gap between said opposable ends doses; and effecting relative lateral positioning of said waveguides to bring said waveguides into alignment.

Throughout this specification, reference is made to optical waveguides. It will be understood by one skilled in the art that this term extends to infrared and ultraviolet regions of the electromagnetic spectrum and is not limited only to visible light.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
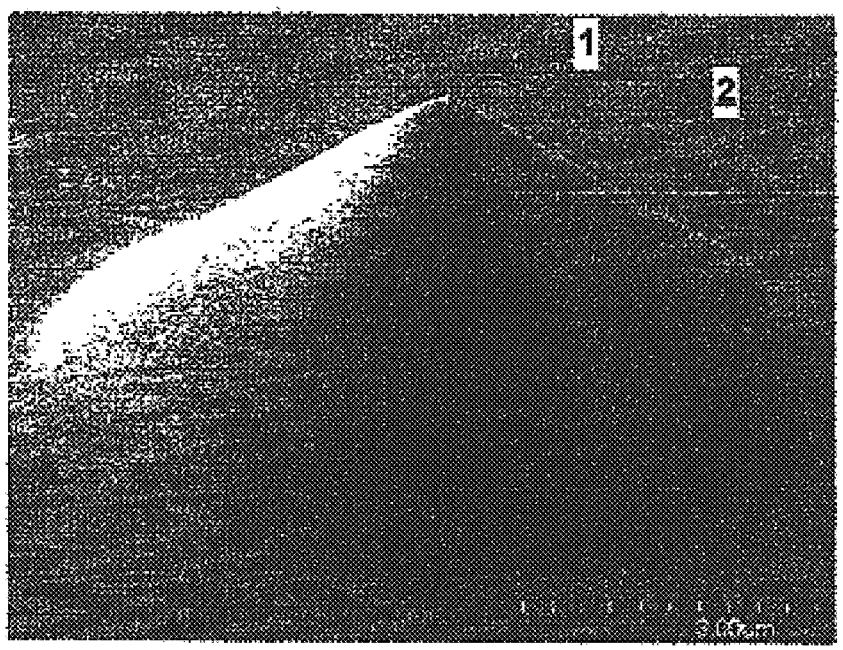
FIG. 1 shows a chemically etched conical structure on a telecom fiber.

FIG. 1 illustrates an example of a conical structure selectively etched with buffered oxide etching solution (BOE) on the end of a telecom standard SMF-28 fiber from Corning. The Corning fiber consists of an inner core, typically about 8 $\mu$m in diameter, and an outer cladding layer having a total diameter of about 125 $\mu$m.

In FIG. 1, the BOE has selectively etched away the outer cladding layer 2, leaving a conical structure 1 on the core. In this example, the etching was carried out at room temperature. The height of the conical structure 1 was 3 $\mu$m.

The core is typically $SiO_2$ doped with Germanium Oxide, $GeO_2$, to increase its refractive index. The $GeO_2$ serves as an etch inhibitor in BOE causing the surrounding $SiO_2$ cladding layer to etch faster than the central core, thereby resulting in the generally conical structure. By contrast, the $GeO_2$ can serve as an etch accelerator, e.g. in hydrofluoric acid solutions, the dopant causes the core to etch away preferentially.

Figure 2:
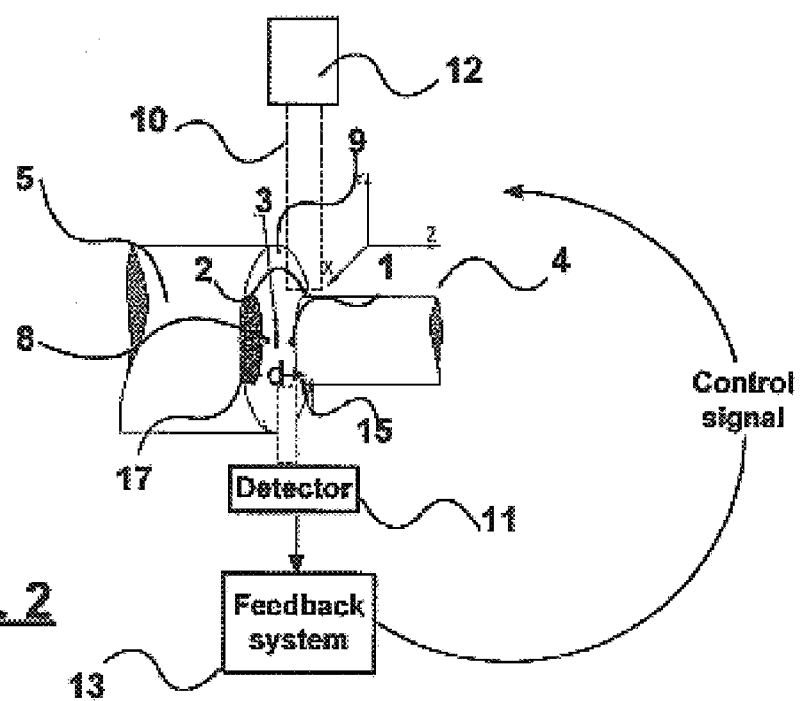
FIG. 2 is a diagram illustrating the alignment of a conical tipped fiber and etched hole fiber.

FIG. 2 shows this waveguide 4 being brought into alignment with a second waveguide 5. In this case the waveguides are optical fibers made of $SiO_2$. The second waveguide 5 was etched in hydrofluoric acid (HF) to produce a complementary hole 3 profile over the core region. In this example, the waveguide 5 was etched with a 20% HF solution in water for 30 minutes at room temperature.

The diameter of the end portion of the waveguide 4 was reduced to ≈80 $\mu$m by etching with a 1.5:1:1 ammonium fluoride:HF:water etchant solution at room temperature. This end portion was then placed in a 6:1 buffered oxide etching solution at room temperature to reduce the outer diameter from ≈80 $\mu$m typically down to 30–40 $\mu$m, and at the same time produce the conical structure 1.

The large difference in diameters between the end portions of the two fibers has the advantage that it reduces the impact of non-perfect fiber cleaves forming slanted end faces which would cause cladding to cladding contact rather than core to core docking. For example, a one degree cleave angle deviation from normal on both of the 125 $\mu$m fibers could create a gap as large as 2 $\mu$m at the center of the fiber. However if one of the fibers is only 30 $\mu$m in diameter then an approximately 0.5 $\mu$m gap would result which is smaller than the typical cone height of 3 $\mu$m.

The low effective spring constant (typically ≈0.02 N/m) of the small diameter fiber 4 (i.e. considering it as a suspended cylindrical cantilever with, for example, a length of ≈1 cm from the clamp point to the end of the fiber) allows the conical tip to safely be pressed onto the cladding surface of the second fiber without damaging the conical structure. When the conical structure lines up with the recess it can snap into the recess relieving the flex or strain in the first fiber. The snapping action can reduce the time it takes to iteratively optimize the relative positions of the fibers to place the conical structure inside the recess with sub-micron alignment accuracy. The low spring constant small diameter fiber can also provide enough angular flex to compensate for a small tilt angle between the two fibers once the fibers dock.

When the two waveguides are brought together, as shown schematically in FIG. 2, a variable gap d is produced between the end faces 2, 9, of the waveguides 4, 5. The gap d is monitored and a feedback signal is generated based upon the size of the gap to the waveguide positioning units. The gap can be monitored using a smart vision system or by other means. This could include making a sharply defined mark 40 near the end of the fiber containing the conical structure, for example, using a pulsed $CO_2$ laser, such as sold by Lumonies Inc., and observing with an optical microscope the movement of the mark towards the second fiber as the gap is reduced and the conical tip enters into the recess. A microscope cross-hair can be targeted to the mark once the conical structure engages the surface of the cladding of the second waveguide. As the conical structure slips into the recess the mark will move away from the cross-hair position and this can be measured to generate a feedback signal.

The gap can also be monitored by taking advantage of the obstruction of the optical transmission of light, such as infra-red light, which is opaque in silica, through the gap as the gap closes. The light can be a focused laser beam 10 from a laser 12. The light source does not have to be a laser. Other suitable light sources can be employed. The transmitted light can be monitored by a detector 11. The amount of light transmitted will decrease to near zero as the gap d closes. The detector 11 can be used to generate a control signal in a feedback system 13 that iteratively moves the fiber ends relative to each other until docking occurs. Docking is detected when the transmitted light is near zero or at a minimum. If it is necessary to first apply index matching compound before docking occurs then the compound should be at least semitransparent at the wavelength of the infra-red source.

Figure 3:
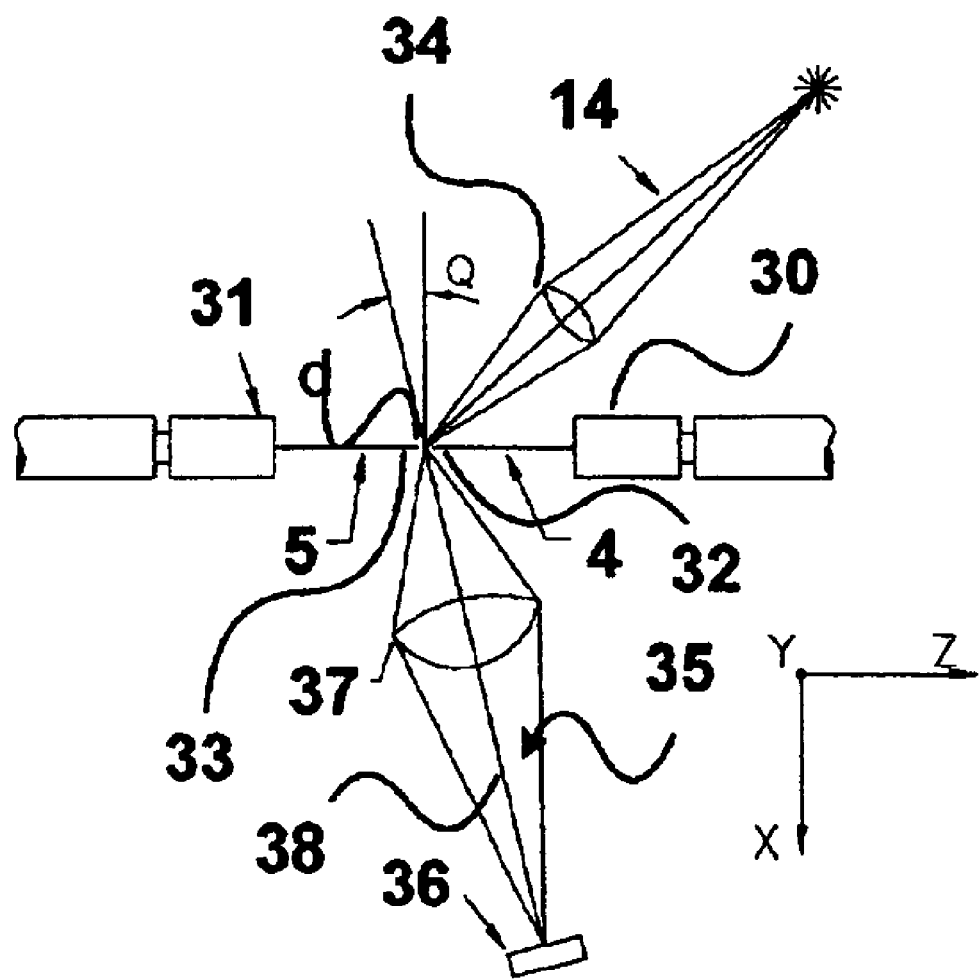
FIG. 3 is a schematic illustration of a vision system.

Details of the vision system are shown in FIG. 3. The optical fibers are securely located in respective fiber holders 30, 31 so as to leave floating end portions 32, 33. One of the end portions may have a reduced diameter as shown in FIG. 2 to assist in the alignment process.

The holders 30, 31 are mounted on positional stands (not shown) so that they can be displaced laterally, rotated and tilted to be brought together to bring the fibers into abutting alignment. Another way of decreasing the spring constant is to increase the distance between the fiber tips and where the fibers are clamped in the holders 30, 31.

The end faces of the fibers are illuminated by an illuminating system 34 arranged at an oblique angle relative to the axis of the fibers. The end of the leftmost fiber 33 in the drawings is viewed by an imaging system 35 consisting of a CCD detector 36 and a lens 37. This imaging system has an optical axis 38 also extending at an oblique angle to the axis of the end portions 32, 33 of the optic fibers.

The imaging system 35 is focused on the virtual image 8 of the conical tip 1 present in the end face 9 of the fiber 5 and the real image of the hole 3, which are visible to the imaging system due to the oblique angle of the optical axis 38. As the fibers are brought together the virtual image 8 of the conical tip 1 in the end face 9 appears to move laterally relative to the hole 3. By laterally displacing the holders 30, 31 relative to each other, the virtual image 8 can be kept in line with the hole 3, and in this way the fibers can be kept in precise alignment as they are brought together. When the fiber faces are close together the virtual image 17 of the perimeter 15 of the small diameter fiber, which can also be seen in the end face, 9 together with the real image of the perimeter of the small fiber can define a gap which can be monitored to observe the closure of the gap.

The lateral position of one waveguide relative to the other is varied as the waveguides are made to approach each other until the conical structure 1 docks into the hole 3 to close the gap. The docking of the complementary structures acts to snap the two waveguides together at which point they can be glued or fusion spliced.

Fiber waveguides can be joined with a fiber splicing apparatus, for example, of the type described by Y. Kato, S. Seikai, N. Shibata, S. Tachigami, Y. Toda and O. Watanabe, Appl. Opt.,vol. 21#II , pp 1916–1921,1982, the contents of which are herein incorporated by reference. They could also be joined by heating the fibers in a controlled manner till the conical structure bonds to the recess but is not seriously deformed by the heating process. The two fibers can then be glued.

Figure 4A:
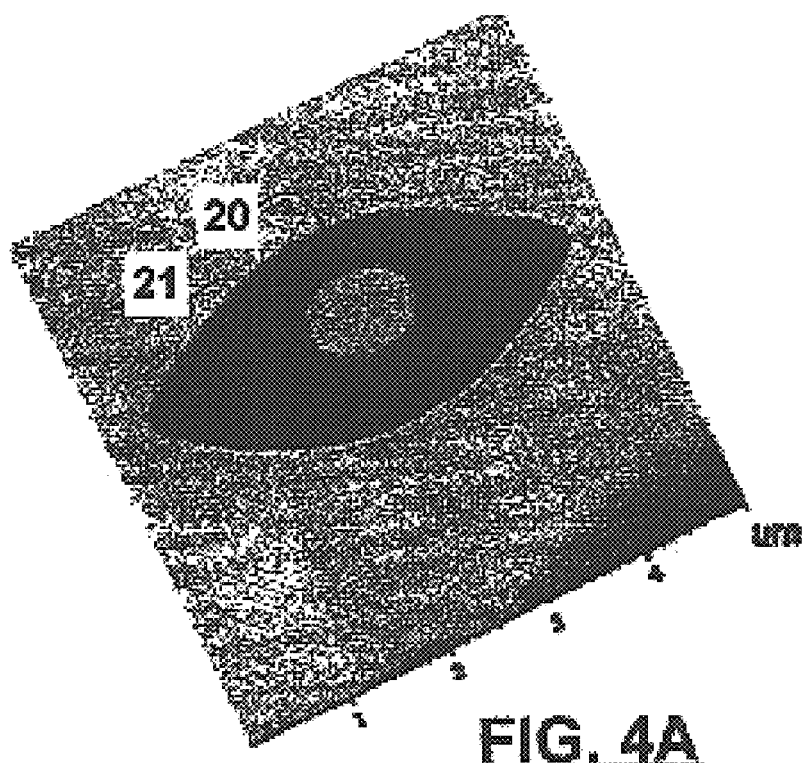
FIG. 4a shows an atomic force microscope (AFM) image of a chemically etched Andrew Corp. polarization maintaining fiber showing a hole and an elevated center.
Figure 4B:
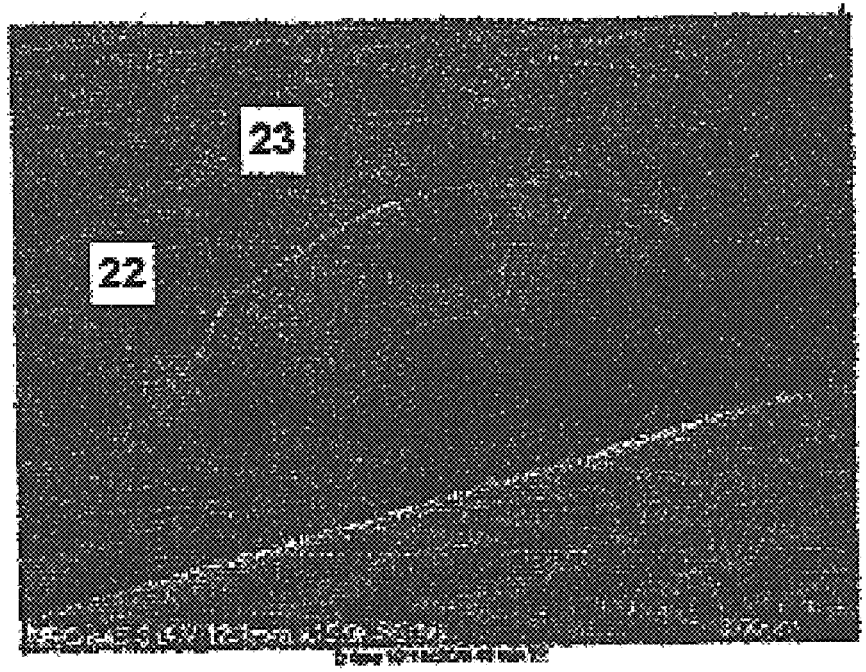
FIG. 4b is a scanning electron micrograph (SEM) of a complementary etched Andrew Corp.fiber with a raised elliptical region and central hole.

The alignment technique can also be used with other fibers. The AFM and SEM images in FIGS. 4A and 4B show that complementary etched profiles can be created even in complicated elliptical core fibers, such as marketed by Andrew Corporation. In FIG. 4A, the fiber was etched in HF to form a hole 20 with a raised center or mesa 21 (the raised region corresponds to an area of low index of refraction which occurs during the manufacturing process), while in FIG. 4B the elliptical core fiber was etched in BOE to form a raised structure 22 but with a hole 23 in its center.

The only way that these two fiber end faces can dock is when they line up perfectly. This will require rotation as well as translation of one of the fibers. The precise alignment of two such small elliptical core polarizing fibers is extremely difficult to do with any alternative techniques.

The alignment technique can also be used to align telecom fibers to arrays of microfabricated silica on silicon channel waveguides or to femtosecond laser written waveguides in a block of dielectric material such as glass. In both cases it is possible to selectively etch a few microns deep hole into the waveguide core to act as a receptacle for the fiber's conical structure.

In some alignment applications it is possible to eliminate the need for the receiving hole for the conical tip as long as there is a well defined visible perimeter for the core cladding interface. This can be accomplished by simply coupling light into the other end of the waveguide, which will easily be seen as emanating out of the core region at the two alignment surfaces. It is also possible to use very weak chemical etching to produce a shallow (e.g. 150 nm) dip in the core region. When this dip is viewed in reflection with preferably red light, it provides a strong signature (due to interference effects) revealing the core/clad boundary. The alignment procedure would be similar to that described above except no docking would occur and the final gap separation would be determined by the height of the conical structure. The two waveguides could then be joined, e.g. with UV cured refractive index matching epoxy. The removal of the need to chemically etch a waveguide to produce a ≈3 $\mu$m hole is more attractive for applications with microfabricated arrays of waveguides.

Figure 5A:
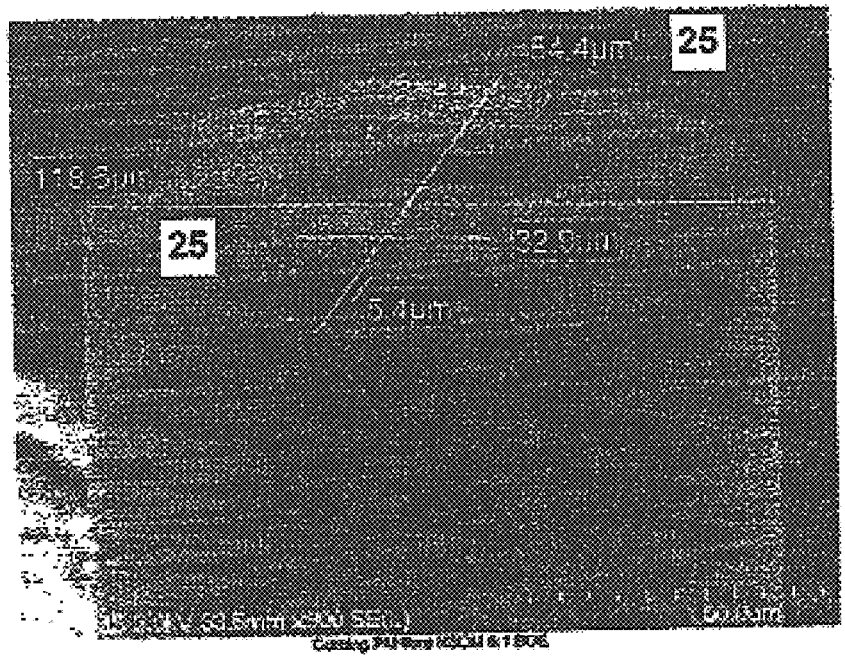
FIGS. 5a and 5b show alternate fiber docking structures.
Figure 5B:
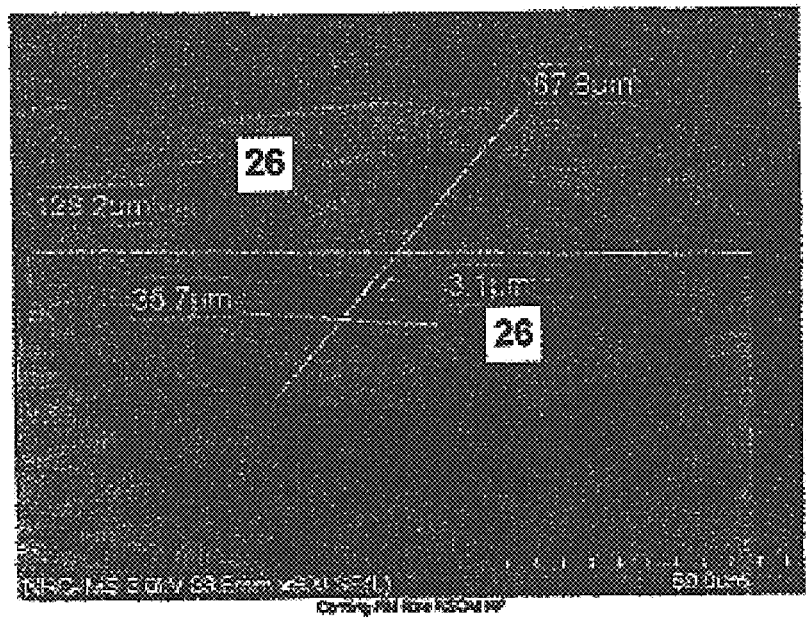

Another variation of the alignment technique is to selectively etch a $SiO_2$ waveguide to produce one or more protrusions (e.g. with BOE) and complimentary holes (e.g. with HF) outside of the core region but within the waveguide cladding to permit fiber to fiber "docking". An outstanding example of this was demonstrated using a Corning Inc. polarization maintaining fiber. These fibers come with two rather large (30 $\mu$m) cylindrical doped regions fabricated into the fiber on either side of the core to create preferential stress in one direction across the core. These doped regions can be selectively etched to create well matched plug 25 and socket 26 parts as shown in FIGS. 5A and 5B. These parts can be joined together to give near perfect alignment of the fiber cores to preserve a high degree of polarization. If the fibers are not docked there is a gap of ≈4 $\mu$m which can easily be measured to generate a feedback signal as described above.

The described selective chemical etching technique is very reproducible and can be considered a batch process. This when combined with the simple vision system to monitor the collapse of the gap between the waveguides during the docking process makes it a practical commercially viable alignment technique. Since the docking occurs between the two cores, the technique is insensitive to either core offset or variations of waveguide dimensions, e.g. fiber diameter.

It will be understood by persons skilled in the art that many additional variations of the invention are possible without departing from the scope of the appended claims.

We claim:

1. A method of aligning first and second optical waveguides with opposable ends, each said optical waveguide having a core and cladding, said method comprising:
   providing a protruding alignment structure on the core of the opposable end of said first optical waveguide, said protruding alignment structure having a progressively decreasing diameter toward a tip thereof and being surrounded by an end face of said first optical waveguide;
   providing a recess in the core of the opposable end of said second optical waveguide for accommodating said protruding alignment structure, said recess being surrounded by an end face of said second waveguide; gradually
   bringing said opposable ends of said waveguides together to produce a variable gap between said end faces;
   monitoring the size of said variable gap to generate a feedback control signal as said opposable ends are brought together; and
   iteratively moving said opposable ends relative to each other in response to said feedback control signal to minimize the size of said variable gap and thereby bring said optical waveguides into alignment as said protruding alignment structure docks with said recess.

2. A method as claimed in claim 1, wherein said recess has a complementary shape to said protruding alignment structure.

3. A method as claimed in claim 1, wherein said protruding alignment structure is formed by selective chemical etching carried out on said first optical waveguide with a first chemical etchant that preferentially etches said cladding layer.

4. A method as claimed in claim 3, wherein said first etchant contains a buffered oxide etchant (BOE).

5. A method as claimed in claim 3, wherein said protruding alignment structure is a generally conical structure.

6. A method as claimed in claim 3, wherein said recess is formed by selective chemical etching carried out on said second optical waveguide with a second etchant that preferentially etches said core.

7. A method as claimed in claim 6, wherein said second etchant contains hydrofluoric acid solution.

8. A method as claimed in claim 2, wherein regions of said opposable ends are doped, and said doped regions are selectively etched to provide said alignment structure and said recess.

9. A method as claimed in claim 2, wherein regions of said opposable ends are modified so that they can be preferentially etched, and said modified regions are preferentially etched to provide said protruding alignment structure and said recess.

10. A method as claimed in claim 9, wherein two or more said regions are modified on each of said opposable ends so that they can be preferentially etched to form a corresponding number of said protruding alignment structures and recesses.

11. A method as claimed in claim 2, wherein one or more of the waveguides is a fiber and wherein the diameter of one of said fibers adjacent said opposable end thereof is reduced by etching to increase its flexibility and permit the waveguides to snap together in a coaxial fashion during docking of said protruding alignment structure and said complementary recess.

12. A method as claimed in claim 11, wherein said diameter is reduced by a factor of about 3.

13. A method as claimed in claim 11, wherein the diameter of the other of said waveguides adjacent the opposable end thereof is reduced by etching by an amount less than the amount by which said one waveguide is reduced.

14. A method as claimed in claim 13, wherein the diameter of said other waveguide is reduced by about 20%.

15. A method of aligning first and second optical fibers having with opposable ends, each said optical fiber having a core and a cladding, said method comprising:
   providing a protruding alignment structure on the opposable end of said first optical fiber, said protruding alignment structure having a progressively decreasing diameter toward a tip thereof;
   providing a recess in the opposable end of said second optical fiber;
   gradually bringing said opposable ends of said optical fibers together to create a variable gap between said opposable ends;
   monitoring the size of said variable gap as said optical fibers are brought together to create a feedback control signal; and
   effecting relative positioning of said opposable ends of said optical fibers in response to said feedback control signal to minimize the size of said gap and thereby bring said optical fibers into alignment as said protruding alignment structure docks with said recess.

16. A method as claimed in claim 15, wherein the size of said variable gap is monitored by transmitting a light beam at one or more wavelengths that can pass between but not through said opposable ends, and monitoring the amount of light transmitted through said variable gap between said opposable ends as said opposable ends come together.

17. A method as claimed in claim 15, wherein said gap is monitored by observing the movement of a mark located on the side of one of the fibers containing said protruding alignment structure and adjacent the end thereof.

18. A method as claimed in claim 17, wherein the location of said mark relative to a reference point in a microscope is monitored to generate said feedback control signal.

19. A method as claimed in claim 15, wherein further comprising a vision system that monitors the relative position of said opposable ends.

20. A method of aligning optical waveguides, comprising:
   providing an alignment structure on at least one opposable end of said waveguides by selective chemical etching;
   gradually bringing said opposable ends together;
   monitoring the relative position of said opposable ends with a vision system as a variable gap closes between said opposable ends;
   effecting relative positioning of said waveguides to bring said waveguides into alignment; and
   wherein a virtual image of said alignment structure is formed in the other of said opposable ends, said vision system is aimed at said virtual image, and said opposable ends are brought into alignment by aligning said virtual image with a target on said other of said opposable ends.

21. A method as claimed in claim 20, wherein said vision system is also aimed at a virtual image of the perimeter of said opposable end carrying said first alignment structure and a real image of said perimeter so as to permit monitoring of the variable gap between said images as said opposable ends are brought together.

22. A method as claimed in claim 20, wherein said target is a second alignment structure.

23. A method as claimed in claim 22, wherein said second alignment structure comprises a recess for accommodating said first alignment structure.

24. A method as claimed in claim 20, wherein said target defines the core/cladding boundary on said other of said opposable ends.

25. A method as claimed in claim 20, wherein said target is an illuminated region on said other of said opposable ends.

26. A method as claimed in claim 20, wherein said vision system has an optical axis lying at an oblique angle to said opposable ends so that said virtual image and said target remain in view of said vision system as said opposable ends are brought together.

27. A method as claimed in claim 20, wherein a feedback control signal iteratively alters the relative position of said opposable ends until said waveguides come into alignment.

28. A method as claimed in claim 20, wherein complementary said alignment structures are formed on said respective opposable ends.

29. A method as claimed in claim 20, wherein said optical waveguides have a core surrounded by a cladding layer, a conical alignment structure is formed on the core of one said opposable end by selective chemical etching, the core of the other opposable end has a shallow recess formed therein, said shallow recess is illuminated to identify the core/cladding boundary, and said conical structure is aligned with said core of the other opposable end with the aid of said illuminated shallow recess.

30. A method as claimed in claim 29, wherein said shallow recess has a depth in the order of $\lambda/4$, where $\lambda$ is the wavelength of light used to reflect off and visualize the shallow recess.

31. A method as claimed in claim 30, wherein the core of the other opposable end forms part of a microfabricated array of waveguides.

32. A method as claimed in claim 28, wherein at least one of said waveguides is a fiber and has a sufficiently low effective spring constant to permit said waveguides to flexibly snap together in a coaxial fashion as they come into contact.

33. A method as claimed in claim 32, wherein said waveguides are mounted in respective holders leaving end portions thereof free, and said effective spring constant can be varied by changing the distance between the tip of said fiber and the position where the fiber is first clamped inside its respective holder and/or by changing the diameter of the fiber.

34. A method as claimed in claim 33, wherein said distance and/or said diameter can be varied to optimize the fiber flexibility to provide good docking.

\* \* \* \* \*